United States Patent [19]

Wilson

[11] Patent Number: 5,675,571
[45] Date of Patent: Oct. 7, 1997

[54] D2B DIVICE ADDRESS INITIALIZATION BY USE OF DEFAULT ADDRESS

[75] Inventor: Neil A. Wilson, Weybridge, United Kingdom

[73] Assignee: D2B Systems Company Limited, Redhill Surry, United Kingdom

[21] Appl. No.: 382,058

[22] PCT Filed: Jun. 24, 1994

[86] PCT No.: PCT/IB94/00173
§ 371 Date: Mar. 13, 1995
§ 102(e) Date: Mar. 13, 1995

[87] PCT Pub. No.: WO95/01025
PCT Pub. Date: Jan. 5, 1995

[30] Foreign Application Priority Data

Jun. 25, 1993 [EP] European Pat. Off. .............. 93201838

[51] Int. Cl.⁶ .......................... H04L 12/40; H04L 29/06
[52] U.S. Cl. ............................. 370/85.1; 370/475
[58] Field of Search ................. 370/60, 85.1, 85.11, 370/85.3, 85.2, 92, 94.1; 340/825.07, 825.52, 825.54; 395/824, 829; 348/721

[56] References Cited

U.S. PATENT DOCUMENTS

| | | | |
|---|---|---|---|
| 4,429,384 | 1/1984 | Kaplinsky | 370/85.1 |
| 4,661,902 | 4/1987 | Hochsprung et al. | 364/200 |
| 4,689,786 | 8/1987 | Sidhu et al. | 370/92 |
| 5,187,708 | 2/1993 | Nakatani et al. | 370/85.1 |
| 5,422,884 | 6/1995 | Göertz | 370/92 |

FOREIGN PATENT DOCUMENTS

| | | |
|---|---|---|
| 0537814 | 4/1993 | European Pat. Off. . |
| 8900717 | 3/1989 | Netherlands . |

Primary Examiner—Douglas W. Olms
Assistant Examiner—Chau T. Nguyen
Attorney, Agent, or Firm—Anne E. Barschall

[57] ABSTRACT

In a single channel communication bus system, e.g. $D_2B$, sometimes two devices of the same type must be initialized at the same time. These devices start out with the same address installed by the manufacturer. The installed address includes follower bits which can be changed to account for the presence of other devices. During initialization, all devices are set to a dummy address and the installed address is stored. Each station then looks for devices having its own installed address. If, after 3 tries, none is found then the stored address is used. If other devices having the installed address are found, the follower bits can be changed. The station iterates until all possible follower bits are exhausted. In this way the stations of the same type have an improved likelihood of being initialized with distinct addresses.

25 Claims, 3 Drawing Sheets

D2B DIVICE ADDRESS INITIALIZATION BY USE OF DEFAULT ADDRESS

BACKGROUND OF THE INVENTION

1. Field of the Invention

The invention relates to a single channel communication bus system. The system include a communication bus having a plurality of stations connected thereto, which can communicate with one another via the communication bus and to each other. A unique station address is assigned to each station. The stations include an interface circuit which is adapted to call any destination station, by generating a destination station address of that destination station, and to receive an acknowledge signal. The acknowledge signal is transmitted by the relevant destination station if the station address of said destination station corresponds to the transmitted destination station address. The interface circuit of a station is further adapted to perform an initialisation program. Under the control of the initialisation program, the interface circuit is able to generate and transmit a destination station address more than one time. Such generation and transmission are discontinued upon absence of acknowledge signal. The destination station address which has been generated and transmitted is assigned as the master station address to said station.

2. Related Art

Such a single channel communication bus system is known from the Dutch patent application No. 8900717 which has been published on Oct. 16, 1990. That patent application describes how a new device or station is added to the bus system. Once the station has been switched on, a-software protocol in said station will initialize the procedure to find a unique address for said station. The station address initialisation involves in fact two steps, a first one is choosing an address and the second one is verifying whether said address is unique. In order to find out whether said address is unique, the added station sends a chosen address on the bus to all other stations which are connected to said bus system. Each station which has already been active in said bus system checks whether the address sent by the newly added station corresponds with its own address or not. In the first situation the station, which identifies the address sent by the newly added device as its own, will send back to the newly added station an acknowledge signal. So, if the newly added station receives an acknowledge signal, it can verify that the address chosen by it previously is not unique. As a result, in a second cycle, the newly added station will choose another address different from the first chosen one and the protocol as described hereinbefore will be repeated up to the moment where no acknowledge signal is received by the newly added station. This means no station already has this address chosen by the newly added station and thus this address is unique. As soon as this situation occurs the newly added station will adopt this unique address as its own.

The above described station address initialisation can be used in a D2B system, which for instance has been described in U.S. Pat. No. 4,429,384. From the description of the D2B system in this U.S. Pat. No. 4,429,384 can be deduced that the D2B should perform in a reliable way in a low cost and possible noisy environment. Experience has shown that signals on buses are sometimes deteriorated which as a consequence means that the above initialisation procedure can be ruined. Some station on the bus system may send an acknowledge signal to inform the newly added station that the address send by it is not unique, but if such acknowledge signal is deteriorated then the newly added station will adopt the address as its own, but the address is not unique. As a result communication between these two stations and without other stations will be disastrous, because if one of the two stations is addressed by another station both stations will respond and mostly in different ways because each station might be a total difference type of device. Also in this case no proper initialisation will take place.

Further the Dutch patent application 8900717 discloses that the message including the destination address also comprises the address of the master station to be initialized, thereby the destination station address and the master station address are the same. In practice it has come clear that use of the same address for the master station and the destination station is problematic, because the receiving part of the master station might read the destination station address and consequently would control the transmitting part of the master station to send an acknowledge signal to itself.

SUMMARY OF THE INVENTION

It is the object of the invention to provide a communication bus system wherein the above described problems are mitigated and address initialisation is carried in a robust reliable noise insensitive way.

It is a further object of the invention to provide a communication system, wherein communication between stations is still possible even in the situation that the initialisation process does not result in finding a unique address for the station to be initialized.

An embodiment of the invention is characterized in that the station, before sending a destination station address during the initialization program, adopts a default address. The default address can be set by the manufacturer of the station, so that if a small communication system is used the default address will be the unique address for the greater part of initialisations. Upon start of the initialisation procedure the master station address is given a default address, which may not be used under normal operation (i.e. after initialisation) by any of the other stations connected to the bus. As a consequence any station to be initialised will not react to its own transmitted messages. Upon determination of a unique address the default address will be replaced by the new found unique address.

In a further embodiment of the invention the single channel communication bus is characterized in that the station upon receipt of acknowledgement upon transmission of its station address during initialization aborts the initialization procedure and adopts the default address as its own unique address.

In accordance with this embodiment the station, which adopted the default address, as its own unique address is still capable of communicating with other stations instead of being switched off due to the fact that there was no specific address available. In the situation, where an address of a station e.g. a VCR can be set by hand by the user to one of two unique addresses (VCR1 and VCR2), it may happen that two stations unavoidably end up with the same address (VCR1 or VCR2) if three like kind stations are present in the system. Now, by use of the default address, the performance of the other two VCR's is not affected, whilst the third VCR still can be part of the system.

In another embodiment of the invention, the single channel communication system is characterized in that upon start of the initialization program with a first address, which is acknowledged, the interface under control of the initialization program is capable of transmitting and generating a plurality of different destination station addresses in a predetermined sequence. Such generation and transmission is discontinued upon absence of the acknowledge signal. The destination station address, which is the last that has been transmitted is assigned as the master station address to said station upon absence of the acknowledge signal. In this embodiment, the station fully automatically searches for a unique address without any interference by the user. In the situation that each and every address of the sequence of addresses has been tested in the initialization procedure and each of said addresses has been acknowledged then the station adopts the default address as its own unique address and thus is then still able to communicate.

Another embodiment of the invention is characterized in that the default address is forbidden to be used by any station operating after initialisation in the bus system.

A further embodiment in accordance with the invention is characterized in that each station has a non volatile memory for storing the address assigned to said station, whereby upon start of the initialisation program the generation and transmission of the different destination station addresses is starting by the address stored previously in said non volatile memory. It has been found in practice that, by use of the address stored previously in said non-volatile memory as a start address in the initialization procedure, the number of attempts to find a unique address is substantially reduced. This reduction is even more drastic if the configuration, i.e. the-stations connected to the bus, has not been changed.

BRIEF DESCRIPTION OF THE FIGURES

The invention will further be explained in detail by use of drawings and corresponding descriptions given herebelow, thereby in the drawings

DETAILED DESCRIPTION OF THE PREFERRED EMBODIMENTS

E(1) General structure of the communication bus system.

Figure 1:
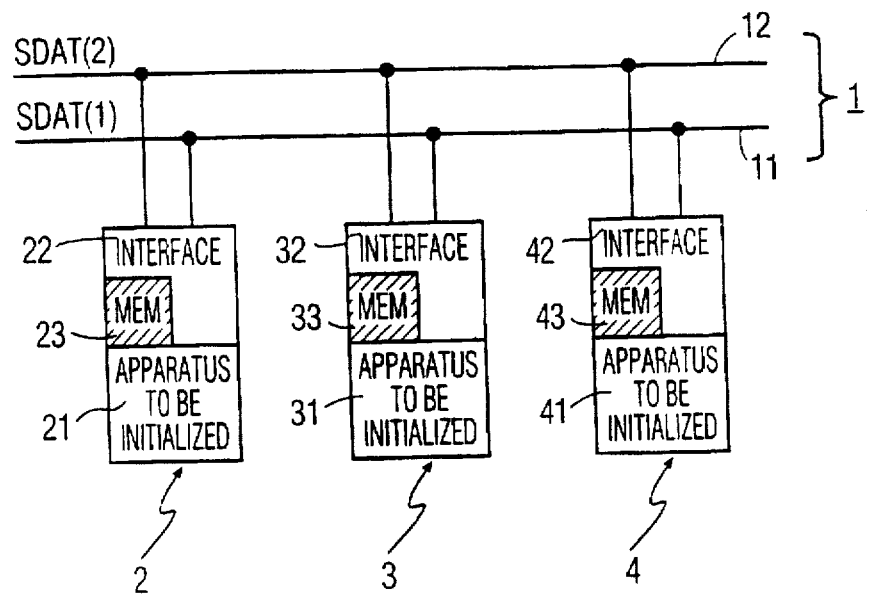
FIG. 1 shows diagrammatically the general structure of a single channel communication system.

FIGS. 1 shows diagrammatically a single channel communication bus system. It comprises a serial communication bus 1 consisting of two data lines 11 and 12. In this case three stations 2, 3 and 4 are connected to this communication bus 1. Each station 2, 3 and 4 respectively comprises an apparatus 21, 31 and 41 respectively which is connected to the data lines 11 and 12 by means of an interface circuit 22, 32, 42. As already noted, such an apparatus may be a TV monitor, a video recorder, an audio recorder, an audio tuner, etc. The communication bus 1 is intended to transmit control signals from a first station to a second station. Any station may act as a master station and thereby all other stations act as destination stations. Some stations will act as transmitters of data, some act as receivers of data. Furthermore, all kinds of mixed or alternating situations are possible. The communication operations on the communication bus, which will herein be described, are performed by the interface circuits 22, 32 and 42. A so-called microcontroller MAB 5051 extensively described in chapter 3 of Single Chip Microcontrollers; User Manual 1988, Philips Electronic Components and Materials, for example, may be used as an interface circuit. To be able to distinguish the different stations, each interface circuit has a programmable, non volatile memory 23, 33, 43 in which a station address is stored. A typical station address comprises twelve bits.

E(2) The message structure.

Figure 2A:
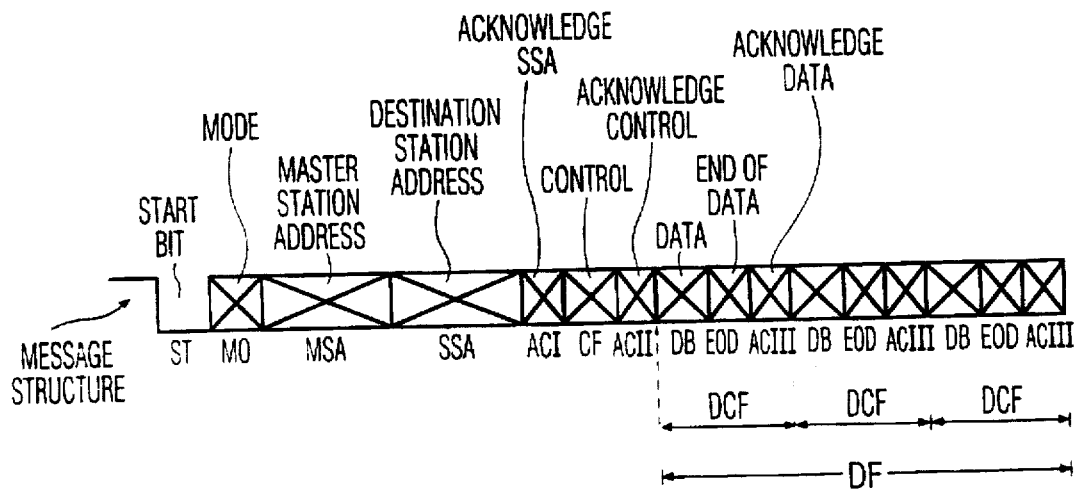
FIG. 2A and FIG. 2B shows diagrammatically the message structure as used on the communication bus.

The general message structure on an information level, which structure is extensively described in Chapter 11 of the User Manual pointed out above, is denoted in FIG. 2A. Such a message structure starts with a start bit ST. It is followed by a mode field MO in which a number of so-called mode indication bits is transmitted. A typical number of mode indication bits is three. They indicate the rate at which the following information will be transmitted. In fact, a limited number of standardized transmitter frequencies have been defined. This mode field is followed by a master station address field MSA. In this field the twelve-bit master station address is transmitted from the station wishing to transmit information to a destination station. The twelve-bit destination station address is subsequently transmitted in the destination station address field SSA. If a station recognizes the destination station address, it transmits an acknowledge code in an acknowledge code field ACI. If this acknowledge code is not received, it means that the destination station is not present or does not function or that the destination station address is received in a mutilated, non-recognizable form by the destination station. In these cases, the communication may be discontinued after the acknowledge code field. If the destination station has transmitted an acknowledge code, the master station transmits a control code of, for example four bits in a control field CF. After reception of this control code, the destination station again transmits an acknowledge code in an acknowledge code field ACII. If this second acknowledge code is not received by the master station, the communication may be discontinued. If the master station has received this second acknowledge code, a data field DF will be sent. In this data field the master DF station transmits data to the destination station, or vice versa. The data field DF comprises one single or a plurality of command fields DCF. Each command field comprises one or more data bytes DB which represents the actual information, an EOD field (end-of-data) the end of the data byte(s) of a command field and/or indicating whether a further command field DCF II, DCF III follows this command field DCF I and an acknowledge code field ACIII in which the destination station indicates that the information has been received correctly. If no acknowledge code ACIII is received, this may mean that i) the actual information is mutilated due to transmission errors, ii) the destination station is switched off after the transmission of the control code, or iii) the destination station is not capable of receiving and buffering the data byte, for example because the processing of this information takes too long. In all these cases i.e. not receiving an acknowledge code AC the master station is set to its repeat mode for sending once again e.g. the whole message. Another possibility is to resend upon absence of an acknowledge code ACIII the relevant command field frequently until the acknowledge code ACIII is ultimately received. If this command field is not the last field, the transmission will be continued by sending the next command field. If this field is the last field, the communication operation is terminated. Subsequently, a new communication operation can be started.

It is to be noted that a number of parity bits is also transmitted in the different fields so as to protect the information from transmission errors.

E(3) The station address.

Figure 2B:
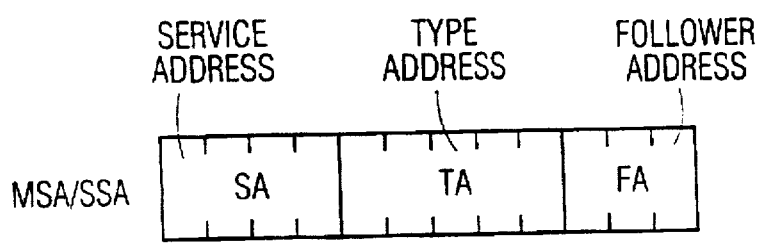

In FIG. 2B the general structure of a station address is shown. It comprises a service address SA, a type address TA and a follower address FA. The service address SA comprises, for example four bits and can thus distinguish sixteen services, for example an audio-video service, a washing service, a cooking/baking service etc. The type address TA comprises, for example five bits so that thirty-two stations can be distinguished within one service. For example, within the washing service a distinction can be made between a washing machine, a drier, a dish washer, etc. and within the audio-video service a distinction can be made between a TV-set, a TV-monitor, a tuner, a video recorder, etc.

It will often occur in practice that the user has a number of apparatuses of the same type, for example, two or more video recorders. The follower address FA enables him to distinguish between these apparatuses of the same type. This follower address comprises, for example three bits so that eight apparatuses of the same type can be distinguished.

E(4) The initialization.

As already noted in the foregoing section, a station address comprises a service address SA, a type address TA and a follower address FA. Service address SA and type address TA have been assigned by manufacturers and in practice the manufacturer programs them in the station address memory (22,33,43) of the interface circuit 22, 32, 42. In practice, the follower address FA will be set to zero (or to III) by the manufacturer and programming of the follower address FA will be done in use and thus does not take place until after the relevant apparatus has been connected to the communication bus 1 by means of the interface circuit. To this end this interface circuit has an initialisation program which comprises, for example the steps shown in FIG. 3 and which is performed as soon as the apparatus is switched on. More particularly after start of the initialisation START:INIT in step 50 the present follower address FA is used to set a test value TST in second step 52 (TST:=FA). Further in said second step 52 the destination station address SSA is made equal to the present master station address MSA (of which the parts SA, TA are fixed and the part FA is to be found). Thereafter the master station address MSA is set to a default value e.g. "FFF"H, which means 1111 1111 1111 in hexadecimal notation. Further in a next step 54 a counter CNT and a not-acknowledge counter NAC are set to zero.

In a next program step 56 the counter CNT is checked as to whether its value is equal or greater than 4. Subsequently in step 58 the counter CNT is increased by one. The reason for this will be explained later on.

In the next program step 60, the start bit ST, the mode bits of the mode field MO subsequently the default station address MSA and finally the destination station address SSA of the destination station with which communication is desired are sent. Detection of lack of receipt of an acknowledge code takes place in a step 62. If no acknowledge is received, this is coded in the acknowledge code field ACI (so that ACI=0 ). Then in a next step 64 the counter value NAC is raised by 1 (NAC:=NAC+1). In the subsequent step 66, it is tested whether absence of an acknowledge bit has been detected three times. If so then in a next step 68 the master station address is set to the destination station address SSA including the then present follower address FA. The initialisation procedure will thereafter end in step 70.

However if in step 66 it is detected that the counter value NAC is less than three the procedure starts again at step 56. Each time the count value NAC will be increased unless in step 62 it is detected that an acknowledge bit has been received in the acknowledge code field ACI (so that ACI=1), the counter value CNT is tested in a step 56. If the counter vale CNT is less than 4 the steps 58 to 66 are performed again. Whenever an acknowledge code occurs (ACI=1) this means that a station is connected to the communication bus which has the same service address, type address and follower address as the transmitting master station. As soon as those times an acknowledge code has been received, the counter value CNT will have the value of four, which means that one of the stations has definitely a station address which should not be used by this master station.

Therefore, after detection that the counter value CNT≧4 a step 72 is carried out, wherein the follower address FA is increased by one. In a next step 74 it is tested whether the follower address FA differs from the test value TST, if so then the initialisation procedure is started again by resetting the counter values CNT and NAC to zero in step 54. If the test value TST equals the follower address FA then all different positions of the latter have been used. If the follower address FA consists of three bits then after 8 trials with different values for FA the starting value TST will be reached due to the setting of TST equal to FA in step 52. In such a situation the initialization procedure is aborted (END) in step 70 and said station cannot communicate via the bus 1.

In the above example four times a message will be sent on the bus and at maximum one failure i.e. acknowledge of a message will be accepted for permitting use of an address by an apparatus connected to the bus 1.

E(5) A further embodiment of the initialisation.

As already noted in the foregoing section, a station address comprises a service address SA, a type address TA and a follower address FA. Service address SA and type address TA have been assigned by manufacturers and in practice the manufacturer programs them in the station address memory (22,33,63) of the interface circuit 22, 32, 42. As said before the follower address FA will be set to zero (or to 111) by the manufacturer and programming of the follower address FA will be done in use and thus does not take place until after the relevant apparatus has been connected to the communication bus 1 by means of the interface circuit. The further embodiment of an initialisation program comprises, for example the steps shown in FIG. 4, which are performed as soon as the apparatus is switched on. More particularly after start of the initialization START:INIT in step 450 the present follower address FA is used to set a test value TST in second step 452 TST:=FA). Further in said second step 452 the destination station address SSA is made equal to the present master station address MSA (of which the parts SA, TA are fixed and the part FA is to be found). Thereafter the master station address MSA is set to a default value e.g. "FFF"H, which means 1111 1111 1111 in hexadecimal notation. Further in a next step 454 a not-acknowledge counter NAC are set to zero.

In the next program step 460 the start bit ST, the mode bits of the mode field MO, subsequently the default station address MSA and finally the destination station address SSA of the destination station, with which communication is desired, are sent. Detection of receipt of absence of an acknowledge code takes place in a step 462. If no acknowledge is received code in the acknowledge code field ACI (so that ACI=0), then in a next step 464 the counter value NAC is raised by 1(NAC:=NAC+1). In the subsequent step 466 it is tested whether three times absence of an acknowledge bit has been detected. If so then in a next step 468 the master station address is set to the destination station address SSA including the then present follower address FA. The initialisation procedure will thereafter end in step 70.

However if in step 466 it is detected that the counter value NAC is less than three the procedure starts again at step 460. Each time the count value NAC will be increased unless in step 462 it is detected that an acknowledge bit has been received in the acknowledge code field ACI (so that ACI=1). Whenever an acknowledge code occurs (ACI=1) this means that a station is connected to the communication bus which has the same service address SA, type address TA and follower address FA as the transmitting master station.

Therefore, the follower address FA is increased by one, in step 472 (FA:=FA+1). In a next step 74 it is tested whether the follower address FA differs from the test value TST, if so then the initialization procedure is started again by setting the counter value NAC to zero in step 454. If the test value TST equals the follower address FA then all different positions of the latter have been used. If the follower address FA consists of three bits then after 8 trials with different values for FA the starting value TST will be reached due to the setting of TST equal to FA in step 452. In such a situation the initialisation procedure is aborted (END) in step 470 and said station cannot communicate via the bus 1.

Of course different possibilities exist for finding unique addresses for the stations (by use of majority votes). The above given examples shall by no means limit the scope of the invention, which apart from test values to be used or of efficiency of the initialisation program does not make any influence on the invention as such.

Figure 3:
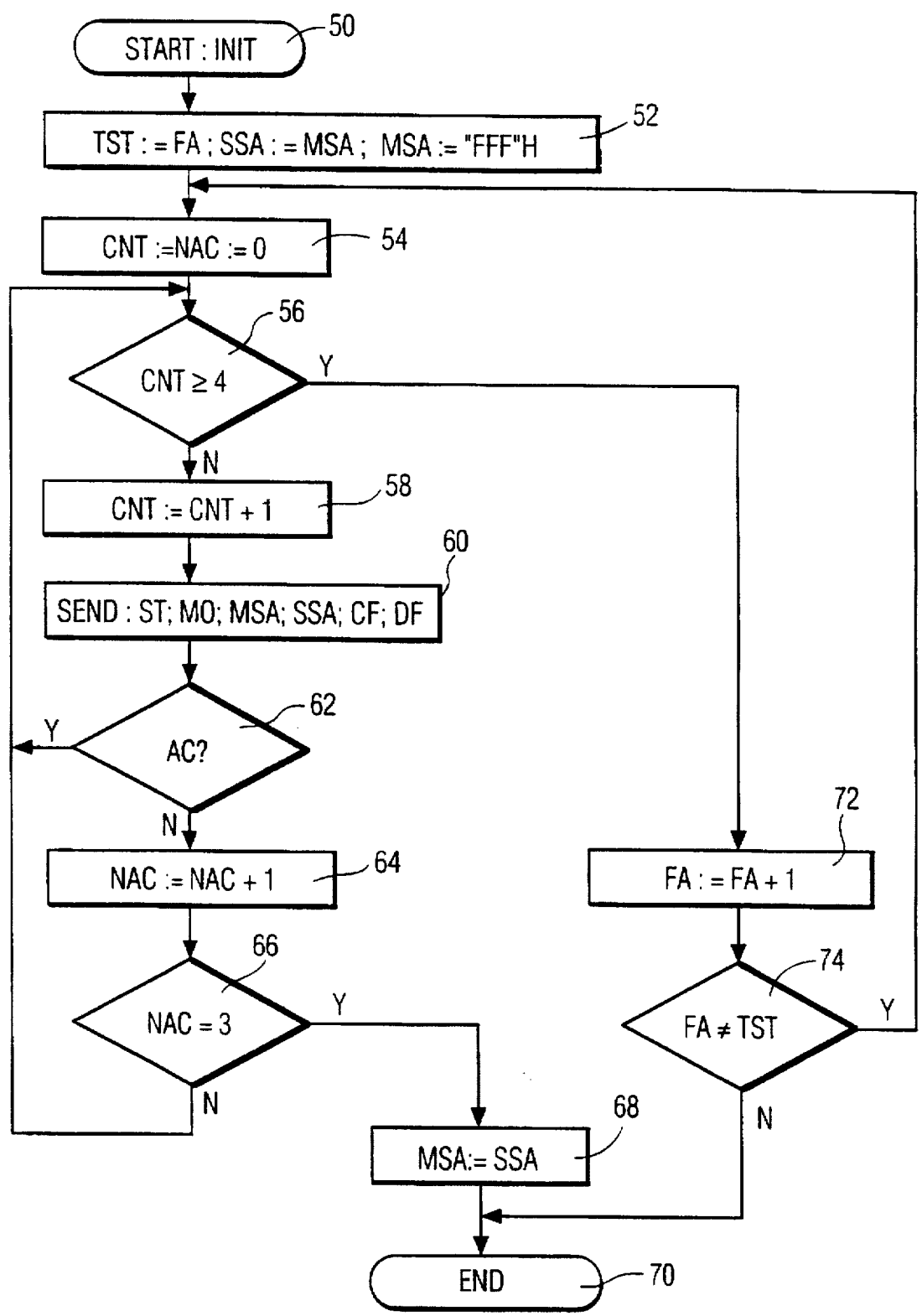
FIG. 3 shows a flow chart for determining the station address of a station in accordance with the invention.
Figure 4:
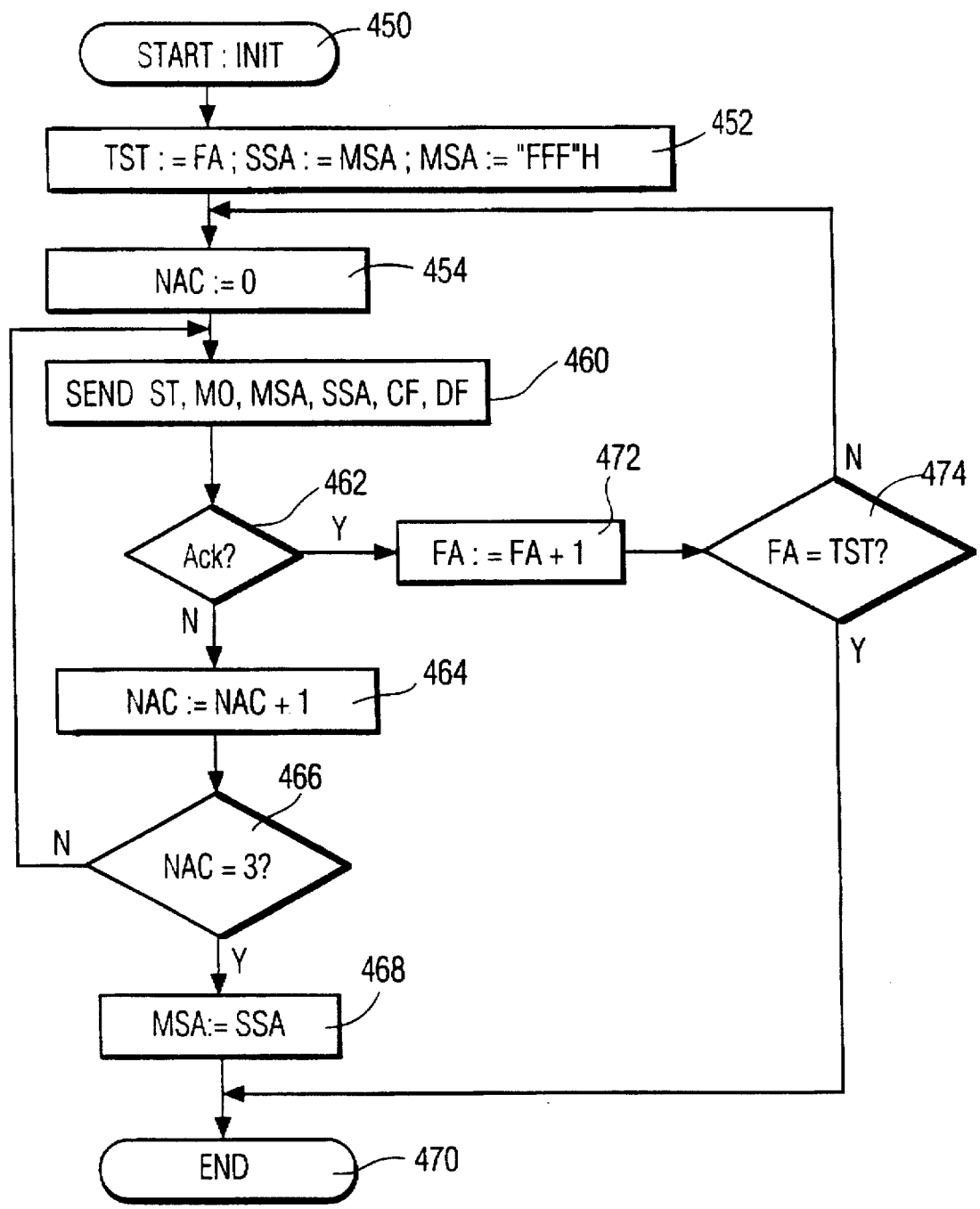
FIG. 4 shows flow chart of a further embodiment of an initialisation program.

In the situation that a station has address setting means to be controlled by the user e.q. a switch for setting the address of a VCR to VCR-1 or VCR-2 the flow charts as shown in FIG. 3 and FIG. 4 can be simplified substantially. The steps 72 and 74 or 472 and 474 can be dispensed with and thus the variable item TST can be dispensed with too (see step 52 and 452). At the end in step 70 or 470 tile master station address will be the default address "FFF", which should be signalled to the user via e.g. a display. The user then can throw a switch in order to change from one preset address of the station (VCR-1) to the second preset address of the station (VCR-2). If this second address is acknowledged in a succeeding initialization procedure, which is triggered by the user by e.g. switching power off and on again, then again the master station address is set to the default address "FFF". If the user does not interfere anymore, then the station continues to operate with the default address.

I claim:

1. A single channel communication bus system comprising a communication bus having a plurality of stations connected thereto, which stations can communicate with one another via the communication bus, to each of which stations a unique station address is to be assigned, each of said respective stations comprising a respective interface circuit for calling any destination station by generating a destination station address for that destination stations, receiving an acknowledge signal that is transmitted by that destination station, if the station address of that destination station corresponds to the transmitted destination station address, interface circuit of a station is further adapted to performing an initialization program under the control of which the interface circuit generates and transmits the destination station address more than one time, discontinuing generating and transmitting upon absence of the acknowledge signal, and the destination station address which has been generated and transmitted being assigned as a master station address for the respective station, characterized in that each station, before sending a destination station address during the initialization program, adopts a default address.

2. A single channel communication bus as claimed in claim 1, characterized that each station, upon receipt of acknowledgement upon transmission of the destination station address during initialization, aborts the initialization program and adopts the default address as its own unique address.

3. A single channel communication bus as claimed in claim 1, characterized in that upon start of the initialization program with a first address, which is acknowledged, the interface under control of the initialization program transmits and generates a plurality of different destination station addresses in a predetermined sequence, said generation and transmission being discontinued upon absence of the acknowledge signal and the destination station address, which is the last that has been transmitted being assigned as the master station address to said station upon absence of the acknowledge signal.

4. A single channel communication bus system as claimed in claim 1, characterized in that each station has a non volatile memory for storing the address assigned to said station, whereby upon start of the initialisation program the generation and transmission of the different destination station addresses is starting by the address stored previously in said non volatile memory.

5. A single channel communication bus system as claimed in claim 1, characterized in that the address generated and transmitted in the initialisation program comprises a fixed part which depends on the type of station, and a variable part which comprises a fixed number of bits.

6. A single channel communication bus system as claimed in claim 5, characterized in that after each generation and transmission of destination station address which is acknowledge by another station on the bus system is incremented by one for some subsequently being transmitted on the communication bus and that initialisation is aborted upon generation and transmission and acknowledgment of all possible addresses available under the fixed number of bits in the variable part of the potential station address.

7. A single channel communication bus as claimed in claim 1, characterized in that the default address is is not normally expected to be used by any station operating after initialization in the bus system.

8. A single channel communication bus as claimed in claim 2, characterized in that upon start of the initialization program with a first address, which is acknowledged, the interface under control of the initialization program transmits and generates a plurality of different destination station addresses in a predetermined sequence, said generation and transmission being discontinued upon absence of the acknowledge signal and the destination station address, which is the last that has been transmitted being assigned as the master station address to said station upon absence of the acknowledge signal.

9. A single channel communication bus system as claimed in claim 2, characterized in that each station has a non volatile memory for storing the address assigned to said station, whereby upon start of the initialization program the generation and transmission of the different destination station addresses is starting by the address stored previously in said non volatile memory.

10. A single channel communication bus system as claimed in claim 3, characterized in that each station has a non volatile memory for storing the address assigned to said station, whereby upon start of the initialization program the generation and transmission of the different destination station addresses is starting by the address stored previously in said non volatile memory.

11. A single channel communication bus system as claimed in claim 8, characterized in that each station has a non volatile memory for storing the address assigned to said station, whereby upon start of the initialization program the generation and transmission of the different destination station addresses is starting by the address stored previously in said non volatile memory.

12. A single channel communication bus system as claimed in claim 2, characterized in that the address generated and transmitted in the initialization program comprises a fixed part which depends on the type of station, and a variable part which comprises a fixed number of bits.

13. A single channel communication bus system as claimed in claim 3, characterized in that the address generated and transmitted in the initialization program comprises a fixed part which depends on the type of station, and a variable part which comprises a fixed number of bits.

14. A single channel communication bus system as claimed in claim 8, characterized in that the address generated and transmitted in the initialization program comprises a fixed part which depends on the type of station, and a variable part which comprises a fixed number of bits.

15. A single channel communication bus system as claimed in claim 12, characterized in that after each generation and transmission of destination station address which is acknowledge by another station on the bus system is incremented by one for some subsequently being transmitted on the communication bus and that initialization is aborted upon generation and transmission and acknowledgment of all possible addresses available under the fixed number of bits in the variable part of the potential station address.

16. A single channel communication bus system as claimed in claim 13, characterized in that after each generation and transmission of destination station address which is acknowledge by another station on the bus system is incremented by one for some subsequently being transmitted on the communication bus and that initialization is aborted upon generation and transmission and acknowledgment of all possible addresses available under the fixed number of bits in the variable part of the potential station address.

17. A single channel communication bus system as claimed in claim 14, characterized in that after each generation and transmission of destination station address which is acknowledge by another station on the bus system is incremented by one for some subsequently being transmitted on the communication bus and that initialization is aborted upon generation and transmission and acknowledgment of all possible addresses available under the fixed number of bits in the variable part of the potential station address.

18. A single channel communication bus as claimed in claim 2, characterized in that the default address is not normally expected to be used by any station operating after initialization in the bus system.

19. A single channel communication bus as claimed in claim 3, characterized in that the default address is not normally expected to be used by any station operating after initialization in the bus system.

20. A single channel communication bus as claimed in claim 8, characterized in that the default address is not normally expected to be used by any station operating after initialization in the bus system.

21. A station for use with a single channel communication bus, the station comprising an installed master address and an interface circuit for interfacing with said bus, which interface circuit stores an initialization program which includes code for using the installed master address as a temporary destination address and using a dummy address as a temporary master address;

code for repeatedly sending out a message checking whether other stations connected to the bus are using the temporary destination address;

code for seeking an acknowledgement of the message; code for, upon no receipt of an acknowledgement, installing the temporary destination address as a master address.

22. The station of claim 21 wherein the code for seeking an acknowledgement sends the message three times and only concludes that there is no acknowledgement after those three times are over.

23. The station of claim 21 wherein the temporary destination address comprises disambiguation bits; and the interface circuit further comprises
code for, upon receipt of the acknowledgement, altering the disambiguation bits of the temporary destination address; and
code for iteratively seeking the acknowledgement and altering disambiguation bits until no acknowledgement is received; and when the temporary destination address is reinstalled as the master address, any altered disambiguation bits are included in the master address.

24. The station of claim 22 wherein the temporary destination address comprises disambiguation bits; and the interface circuit further comprises
code for, upon receipt of the acknowledgement, altering disambiguation bits of the temporary destination address; and
code for iteratively seeking of the acknowledgement and altering disambiguation bits until no acknowledgement is received; and when the temporary destination address is reinstalled as the master address, any altered disambiguation bits are included in the master address.

25. A bus system comprising a plurality of stations as claimed in claim 21; and
a single channel communication bus for allowing the stations to communicate with each other and themselves.

* * * * *